Patented Oct. 28, 1941

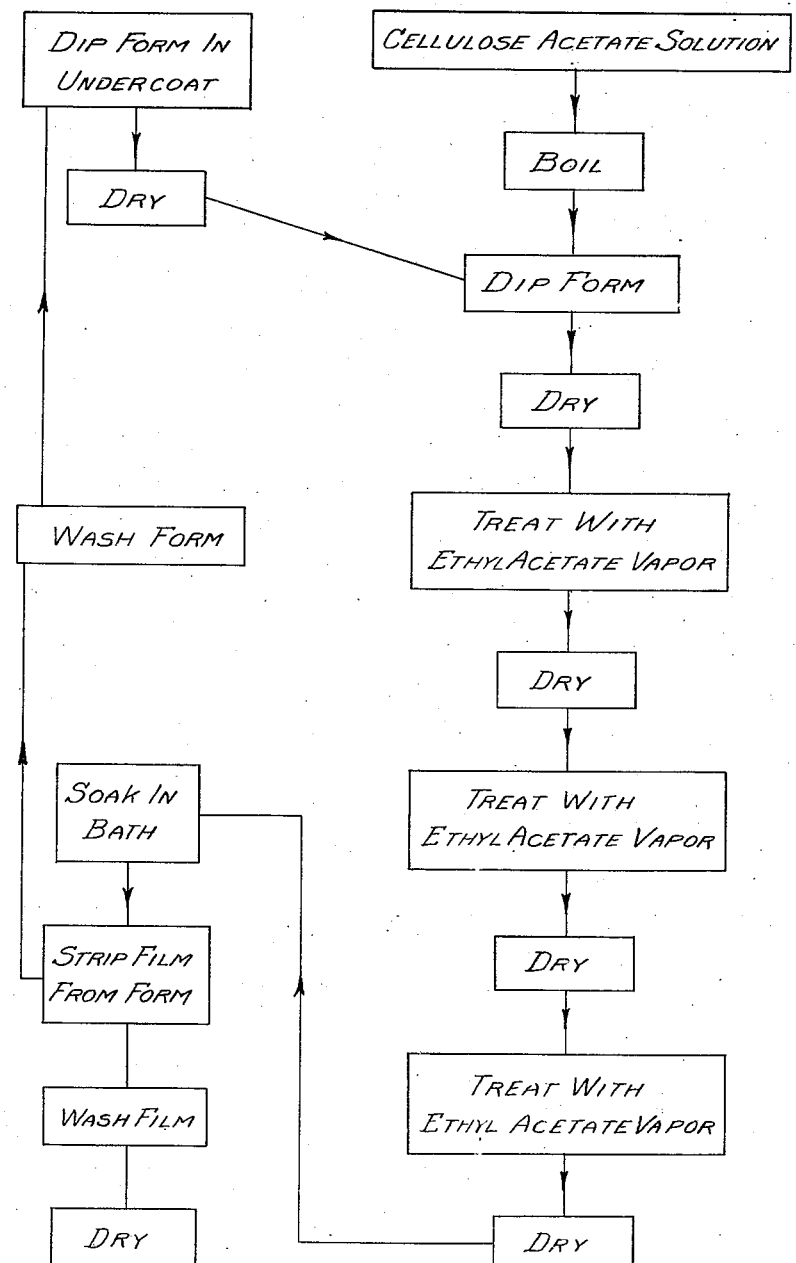

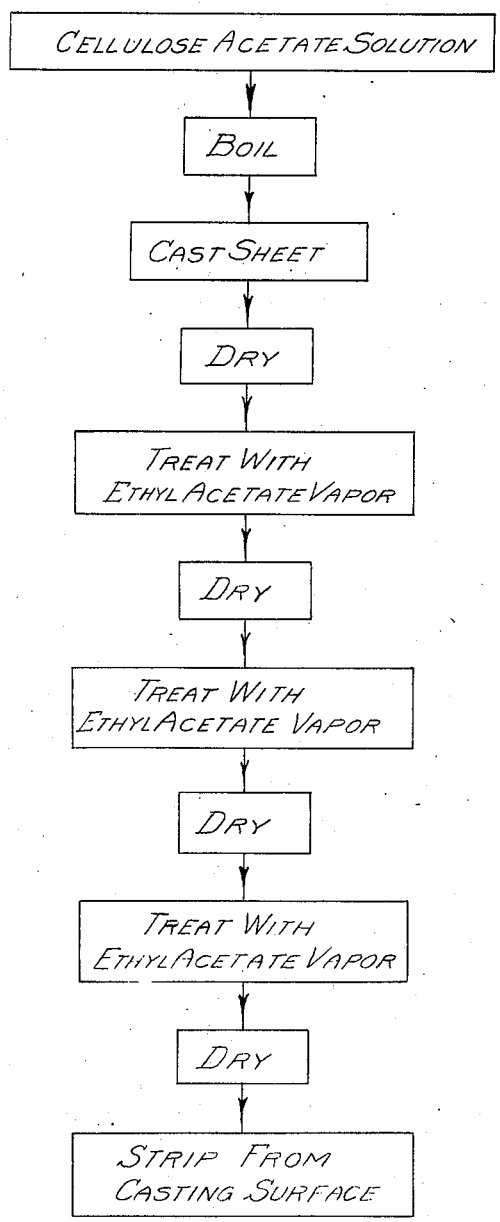

2,260,741

UNITED STATES PATENT OFFICE 2,260,741

METHOD OF FORMING FILMS FROM CELLULOSE DERIVATIVES

George A. Dalin, Hartford, Conn., assignor to Plax Corporation, Hartford, Conn., a corporation of Delaware Application October 10, 1938, Serial No. 234,097

11 Claims. (Cl. 18—57)

This invention relates to methods of forming films such as hollow articles or sheets from solutions of organic compounds, particularly solutions of cellulose derivatives such as cellulose acetate, with suitable plasticizer, in acetone or other volatile solvent.

It has been proposed prior to the present invention to form hollow articles by dipping forms in a solution of cellulose acetate. This is accomplished by immersing glass or metal forms in the solution to form films thereon which films are dried by evaporation of the solvent and are then stripped from the forms. The dipping forms may be mounted in frames or carriers of a machine so that a large number of films or articles can be formed in each cycle of operations.

Although useful articles of various kinds may be produced by prior dipping methods, such methods have certain disadvantages which adversely affect the quality of the products and the cost of producing them. One disadvantage is that a relatively dilute solution of cellulose acetate in acetone must be employed. Satisfactory articles may be produced from a dilute solution by a single dipping operation without difficulty, but such films are very thin, being not in excess of about five-thousandths (.005) of an inch in thickness whereas films of fifteen-to twenty-thousandths (.015 to .020) of an inch usually are desired. Therefore, the forms must be dipped in the solution a number of times to build up films of the desired thickness. Usually, at least three dips are necessary, each dip being followed by a drying period.

However, increasing the number of dipping operations tends to increase the formation of bubbles in the films. This tendency might be reduced by drying the films in an atmosphere of the solvent vapor. But such method of drying materially increases the time required for drying and some bubbles are apt to remain in the films. Also, such method usually requires that the apparatus be enclosed to prevent the escape of vapor and this increases the explosion hazard.

Likewise in casting films in sheet form from a solutions of cellulose derivatives dilute solutions are employed in prior methods in order to minimize the formation of bubbles in the sheets and to facilitate casting. The solution is cast on a wheel or band from a hopper which has a doctor blade associated therewith for regulating the thickness of the sheet. The sheet is dried by evaporation of the solvent and when sufficiently dry is stripped from the casting surface. The use of dilute solutions for casting also is objectionable because of the limitation on the thickness of sheet which can be formed in this manner, the long time required for drying and because of the cost of solvent employed. To obtain thicker sheets, cast films have to be laminated or the sheets have to be cut from a pressed cake or block of material.

The general object of the present invention is to provide a novel method of forming films, such as hollow articles or sheets, from solutions of cellulose derivatives which method reduces or eliminates the above and other disadvantages of prior methods.

A more specific object of the invention is to provide a novel method of forming films or articles from solutions of cellulose derivatives by the use of which the tendency to form bubbles in the films or articles is materially reduced.

Another object is to provide a novel method by the employment of which materially thicker films of cellulose derivatives may be obtained from solutions thereof by a single dipping or casting operation than in prior methods.

A further object of the invention is to provide a novel method of forming films from solutions of cellulose derivatives by which the films may be prepared more rapidly than in prior methods.

Other objects and advantages will be pointed out in, or will become apparent from, the detailed description which follows and the accompanying drawings which depict the preferred procedure embodying the novel method and in which drawings:

Fig. 1 is a diagram of the sequence of steps in forming films by dipping in accordance with the invention; and Fig. 2 is a diagram of the sequence of steps which may be followed in casting sheets when employing my invention.

Considered in its broader aspects, my novel method involves the preparation of a solution by dissolving cellulose acetate and suitable plasticizer in a relatively small amount of acetone to provide a relatively viscous solution. This solution is made by stirring while heating to a temperature just below boiling, say 51° C., and permitting the solvent vapors formed to pass into a reflux condenser.

When the cellulose acetate and plasticizer are completely dissolved in the acetone, the solution is treated to remove all or substantially all dissolved gases or vapors and particularly air therefrom. This may be accomplished by heating or preferably boiling to drive off vapors of the acetone which are passed into a reflux condenser.

Preferably, the heating or boiling is effected at atmospheric pressure although it may be accomplished under vacuum. As a result of this treatment dissolved gases and vapors are swept out by the acetone vapors as they are driven off from the solution and pass out of the system through the reflux condenser. This greatly reduces the formation of bubbles in the films formed from the solution when the films are dried. If the viscosity of the solution is too high at this time, it may be adjusted to the desired value by the addition of boiled acetone. An excess of solvent may be added to the initial mixture to compensate for loss thereof caused by boiling or heating. The solution is now ready for the dipping or casting operation.

In the production of films by dipping (see Fig. 1) suitable forms are dipped into the above solution to form films thereon. The forms may be made of metal or glass and preferably are first washed and then may be dipped in a suitable liquid to provide an undercoating which will act as a lubricant and assist in stripping the films from the forms. This undercoating may be dried before the forms are dipped in the dipping solution. Examples of undercoating materials are soap solution, molten or dissolved wax, or a solution in water of glycerine, gelatine or water soluble gum and sugar. If an undercoating is not employed, the forms should be highly polished.

The dipping solution preferably is maintained at a temperature just below boiling, say 51° C. while the forms are dipped therein. By maintaining the solution at such temperature, its viscosity is low enough to permit the dipping operation to be performed. In other words, the solution which I employ is too viscous for the forming of films at ordinary or room temperature. However, at a high enough temperature, say 51° C., the viscosity is low enough so that by using a proper rate of withdrawal of the form from the dipping solution a film can be prepared which is of suitable thickness, and does not have a tail suspended from the lower end of the form. However, if it is desirable to form films under such conditions that tails form or tend to form as, for instance, where films of increased thickness are desired, such tails may be avoided by withdrawing the forms at a sharp angle, say 45 degrees or less, to the surface of the solution while slowly revolving them. Tails can also be eliminated by very quickly flipping the forms to cause the tails to fall over on the bodies of the films which permits the tails to be absorbed by the films before the tails and the films set.

The films are now dried at about 45° C. while the forms are rotated horizontally to prevent the films from running.

During this drying operation, wrinkles form or tend to form in the films. This is due to the fact that evaporation of the acetone proceeds from the outer surface, which hardens and assumes a definite size and shape. When the inside portion of the film begins to harden it shrinks and causes or tends to cause wrinkles to form on the outside of the film. I have discovered that this wrinkling can be prevented by treating the films with a solvent vapor. I prefer to use for this purpose the vapor of a solvent which has a higher boiling point than acetone and ethyl acetate is preferred although other solvents may be used with good results.

The films are treated with ethyl acetate at intervals during the drying period, for example, by holding them in the vapor of the solvent provided by heating a quantity of the ethyl acetate in a jacketed container at a temperature of about 61° C. The ethyl acetate vapor condenses uniformly on the films and softens their surfaces thus removing wrinkles or incipient wrinkles.

The speed at which the films dry is not appreciably reduced by this treatment because only a small quantity of ethyl acetate is absorbed. However, the effect of the ethyl acetate lasts for a few minutes because of its comparatively low vapor pressure and therefore it does not have to be renewed frequently. Ordinarily, the films are treated with ethyl acetate in the above manner three times at intervals in the drying of the films at about 45° C. After such treatments, the films are free of wrinkles and can be further dried without wrinkling.

Further drying of the films may now be effected until drying is complete or nearly so. The final drying may be accelerated by increasing the temperature in stages in increasing periods of time.

When sufficiently dried, the films are stripped from the forms. If the forms have been treated with an undercoating material, the films are soaked in water to soften such material. The water for soaking may be heated. The films also may be soaked, for a much longer period, if no undercoating material is employed. If highly polished forms are used, that is, chromium or nickel plated forms, or forms of polished brass, soaking of the films may be omitted. In this event tapered forms are employed.

The films are stripped from the forms by applying a jet of air beneath the upper edge of each film. After removal from the forms the films are washed and dried. The forms are now washed and dipped in the undercoating material, if such material is employed, and the undercoating dried. The forms are now ready for another cycle of film forming operations.

EXAMPLE 1.—*Dipping*

A composition for carrying out the invention may be prepared according to the following formula:

Cellulose acetate _____pound__ 1
Plasticizer_____ounces__ 5
Acetone_____pounds__ 2½

The cellulose acetate employed preferably has a viscosity of 4 seconds as determined by the viscosity test of the A. S. T. M.

The plasticizer may be any suitable composition such as methyl phthalyl ethyl glycollate. Other types of plasticizers may be employed singly or in combination.

The above composition is characterized by the relatively small amount of acetone which it contains. Dipping solutions heretofore employed usually have contained about four pounds of acetone to one pound of cellulose acetate. The above composition and method permit a reduction of approximately 40 per cent in the amount of acetone used. This results in substantial savings in the cost of the dipping solution and hence of the finished products.

The above materials in approximately the proportions set forth are mixed by stirring and heating at about 51° C. in a jacketed vessel connected with a reflux condenser. When solution is completed, it is boiled for about 5 minutes and then cooled to 51° C. The viscosity is adjusted to the desired value by the addition of boiled acetone.

Viscosity of the solution may be determined by ascertaining the time required for a one-eighth inch steel ball to fall between two circles two and one-half inches apart inscribed around a two quart jar containing the solution at 51° C.

Preferably the viscosity as above determined is adjusted to between 7.0 and 11.0 seconds at 51° C., the method being carried out most successfully in this range. It will be observed that this range of viscosity is materially higher than the viscosity of dipping solutions heretofore used which vary from about ½ to 1 second as determined by the above method.

The dipping solution prepared as above explained, is held in a suitable vessel and maintained at a temperature of approximately 51° C., that is, at a temperature just below the boiling point, while the previously prepared forms are dipped therein.

The forms may be prepared by washing in water for about 2 minutes, drying and dipping them in an undercoating solution of approximately the following composition:

| | Grams |
|---|---|
| Gelatine | 100 |
| Dextrose | 100 |
| Glycerine | 20 |
| Water | 800 |

The above solution is heated at about 45° C.

The forms are now dried at about 120° C. for about 15 minutes to harden the undercoating thereon.

The forms are now dipped once only in the dipping solution and withdrawn. The rate of withdrawal is varied according to the viscosity of the solution and the thickness of the film desired, the thickness increasing with the rate of withdrawal. With forms one inch in diameter and six inches in length and solutions varying in viscosity from 7 to 11 seconds, rates of withdrawal varying from about .17"/sec. to 2"/sec. will produce films varying in thickness from about .006" to about .025". For example, with a solution having a viscosity of 8.6 seconds, and a rate of withdrawal of about .27 inch per second films of approximately .020 inch in thickness will be formed. With a sufficiently viscous solution and a slow rate of withdrawal, films up to fifty-thousandths (.050) of an inch may be formed by a single dipping operation.

The forms are now subjected to a temperature of about 45° C. and rotated in horizontal positions to dry the films. After drying for about 2 minutes, the forms are held in ethyl acetate vapor for about 2 seconds, again dried at 45° C. for 5 minutes, placed in ethyl acetate vapor for 5 seconds, dried at 45° C. for 9 minutes and finally held in ethyl acetate vapor for 10 seconds. The films are now dried at 45° C. for 10 minutes, at 55° C. for 15 minutes and 65° C. for 69 minutes.

Preparatory to stripping the films from the forms, they are soaked in water at 51° C. for 50 minutes. This softens the undercoating and permits the films to be blown off the forms by an air jet.

The films may now be washed in water and dried.

Numerous advantages result from my novel method. Chief among these is the formation of a relatively thick film by a single dipping operation. This is made possible by the treatment of the solution to remove dissolved gases therefrom which in turn permits the use of a sufficiently concentrated solution to form a thick film by a single dipping operation which film is free of bubbles which would otherwise be formed from such gases. The production of such thick films is also made possible by the treatment of the films with ethyl acetate which prevents wrinkling and reduces strain in the films.

Another advantage is the saving of acetone previously mentioned which reduces material costs and drying time. Drying time is principally reduced, however, by drying at high temperature. The use of high temperature may reduce the drying time of prior methods up to fifty per cent.

Still another advantage is the reduction in mechanism and mechanical operations resulting from the use of one instead of three dipping operations.

Variations may be made in the composition of the dipping solution and in the details of the method without departing from the scope of the appended claims. For example, the dipping forms may be heated internally by a heated fluid medium or electrical resistances to assist in drying the films. This serves to heat the inner sides of the films, thus causing more rapid migration of the acetone outwardly through the films and more rapid and more uniform drying than is obtained by heating the films only externally.

A feature of the method not described above and which constitutes a part of the invention is the treatment of the dipping solution in the dipping pool to remove bubbles therefrom which may be introduced by the dipping operations. This may be accomplished by circulating the solution from the dipping pool through a circuit in which the solution is boiled and solvent vapors passed into a reflux condenser to remove the bubbles and dissolved gases, the solution then being cooled to a temperature below the boiling point, say 51° C., and returned to the dipping pool. If desired, the solution may be returned to the pool without being cooled to below the boiling point.

EXAMPLE 2.—*Casting*

In casting sheets according to the method of my invention (see Fig. 2) a solution is prepared in substantially the same manner as for dipping and is supplied to a suitable device or hopper for discharging the solution on the casting surface. The thickness of the sheet is regulated by a doctor blade in known manner. Preferably the solution is kept entirely closed to the point at which it is cast.

The casting surface may be a plate or a revolving wheel but preferably an endless metallic band is employed. The casting surface need not be provided with an undercoating.

The cast film or sheet is now alternately dried and subjected to ethyl acetate vapor as it is carried along by the endless band. To accomplish this, heating and vapor chambers of suitable construction are provided in the path of the band and overlying its sheet bearing surface. The chambers are the proper length with relation to the speed of the band to provide the desired periods of heating and vapor treatment. Thus the sheet passes under a heating chamber and is heated to about 45° C., a given point on the sheet moving from one end of the chamber in say 2 minutes. The sheet now passes through the vapor chamber, a point thereon moving through the chamber in about 2 seconds. In like manner, the sheet is heated at 45° C. and vapor-treated for 5 minutes and 5 seconds respectively and again heated and vapor-treated for 9 minutes and 10 seconds respectively. Drying is now accelerated by movement of the sheet through heating chambers to heat the sheet at 45° C. for 10 minutes, at 55° C. for 15 minutes and at 65° C. for 69 minutes. The sheet may be stripped from the band beyond the last heating chamber and cut into desired lengths or wound into a roll.

The band on which the sheet is cast may be heated from beneath to a temperature of approximately 45° C. to increase the rate of evaporation of the solvent from the sheet. If this is done, the drying periods described above may be shortened.

It will be understood that variations may be made in the periods and temperatures of drying treatment and in the number and lengths of periods of vapor treatment.

By employing my novel method, thicker sheets may be cast at less cost and in less time than by prior methods.

The values of viscosity recited in the claims are the values determined by the method described above.

In the above description of the invention the temperature of about 51° C. has been specified as the preferred temperature at which the cellulose acetate solution is to be heated for dipping and casting. This temperature will be slightly below the boiling point. It is to be understood, however, that the temperature of the solution may be increased advantageously to or above the boiling point in some cases. For example, in forming thicker films by employing solutions having higher viscosities than those specified, that is, above 11 seconds as herein determined, the solutions may be heated well above 51° C. and above the boiling point or points and this may also be done with solutions of 11 seconds and below in viscosity.

Having described my invention, what I claim is:

1. The method of forming films from a viscous solution of cellulose acetate in acetone which comprises coating a surface with said solution to form a film thereon, drying said film under such conditions that said film tends to wrinkle, and subjecting said film to a solvent for the cellulose acetate of higher boiling point than acetone to counteract the tendency of said film to wrinkle.

2. The method of forming films from a viscous solution of a cellulose derivative in a solvent of relatively low boiling point which comprises coating a surface with said solution to form a film thereon, and alternately drying said film and subjecting it to a solvent for the cellulose derivative of higher boiling point than the first-named solvent.

3. The method of forming hollow articles from a viscous solution of cellulose acetate in a solvent of substantially lower boiling point than ethyl acetate which comprises, dipping forms once only in said solution to form films of desired thickness thereon, drying said films and at intervals during such drying subjecting said films to ethyl acetate to prevent the formation of wrinkles on said films, and stripping said films from said forms.

4. The method of forming hollow articles from a viscous solution of cellulose acetate in a solvent of substantially lower boiling point than ethyl acetate which comprises, dipping forms once only in said solution to form films of desired thickness thereon, drying said films and at intervals during such drying subjecting said films to ethyl acetate to prevent the formation of wrinkles in said films, and stripping said films from said forms, said films being finally dried on said forms at increasing temperature in increasing periods of time.

5. The method of forming hollow articles from a viscous solution of cellulose acetate in a solvent of substantially lower boiling point than ethyl acetate which comprises, dripping forms once only in said solution to form films of desired thickness thereon, drying said films at approximately 45° C. and at intervals during such drying subjecting said films to ethyl acetate vapor to prevent wrinkles in said films, drying said films at increasing temperatures in increasing periods of time, soaking said films, and stripping said films from said forms.

6. The method of forming relatively thick films of cellulose acetate which comprises coating a surface with a viscous solution of cellulose acetate in a solvent of substantially lower boiling point than ethyl acetate to form a film thereon, and alternately drying and subjecting the film to ethyl acetate vapor to prevent wrinkling of said film during the drying thereof.

7. The method of forming relatively thick bubble free films of cellulose acetate which comprises preparing a viscous solution of cellulose acetate and plasticizer in acetone, boiling said solution with reflux to remove dissolved gases therefrom, passing said solution into a pool, dipping forms in said pool to form films thereon, said solution being maintained at a temperature of approximately 51° C., and passing solution from said pool through a circuit in which said solution is boiled with reflex to remove dissolved gases or bubbles introduced during said dipping operation and returning such solution to said pool.

8. The method of forming films from a viscous solution of cellulose acetate in acetone, which comprises coating a surface with said solution to form a film thereon, drying said film so rapidly as to form wrinkles therein, and removing said wrinkles before said film is completely dried by exposing the surface of said film to the action of the vapor of a solvent for the cellulose acetate having a higher boiling point than acetone.

9. The method of forming films from a viscous solution of cellulose acetate in acetone which comprises coating a surface with said solution to form a relatively thick film thereon, which tends to wrinkle when drying, drying said film, and uniformly condensing on the surface of said film the vapor of a solvent for the cellulose acetate of higher boiling point than acetone to prevent permanent wrinkling of said film during the drying thereof.

10. The method of forming films from a viscous solution of cellulose acetate in acetone which comprises coating a surface with said solution to form a film thereon, drying said film for approximately two minutes at approximately 45° C., exposing said film to ethyl acetate vapor for about two seconds, drying said film for approximately five minutes at approximately 45° C., exposing said film to ethyl acetate vapor for approximately five seconds, drying said film for about nine minutes at approximately 45° C., exposing said film to ethyl acetate vapor for about 10 seconds, and finally drying said film.

11. The method of forming films from a viscous solution of cellulose acetate in acetone which comprises coating a surface with said solution to form a film thereon, drying said film for approximately two minutes at approximately 45° C., exposing said film to ethyl acetate vapor for about two seconds, drying said film for approximately five minutes at approximately 45° C., exposing said film to ethyl acetate vapor for approximately five seconds, drying said film for about nine minutes at approximately 45° C., exposing said film to ethyl acetate vapor for about ten seconds, and finally drying said film at about 45° C. for about ten minutes, at about 55° C. for about 15 minutes, and at about 65° C. for about 69 minutes.

GEORGE A. DALIN.